Dec. 18, 1945.  B. P. McKINLEY  2,391,065
ELECTRICALLY HEATED DEVICE
Filed June 14, 1941  2 Sheets-Sheet 1
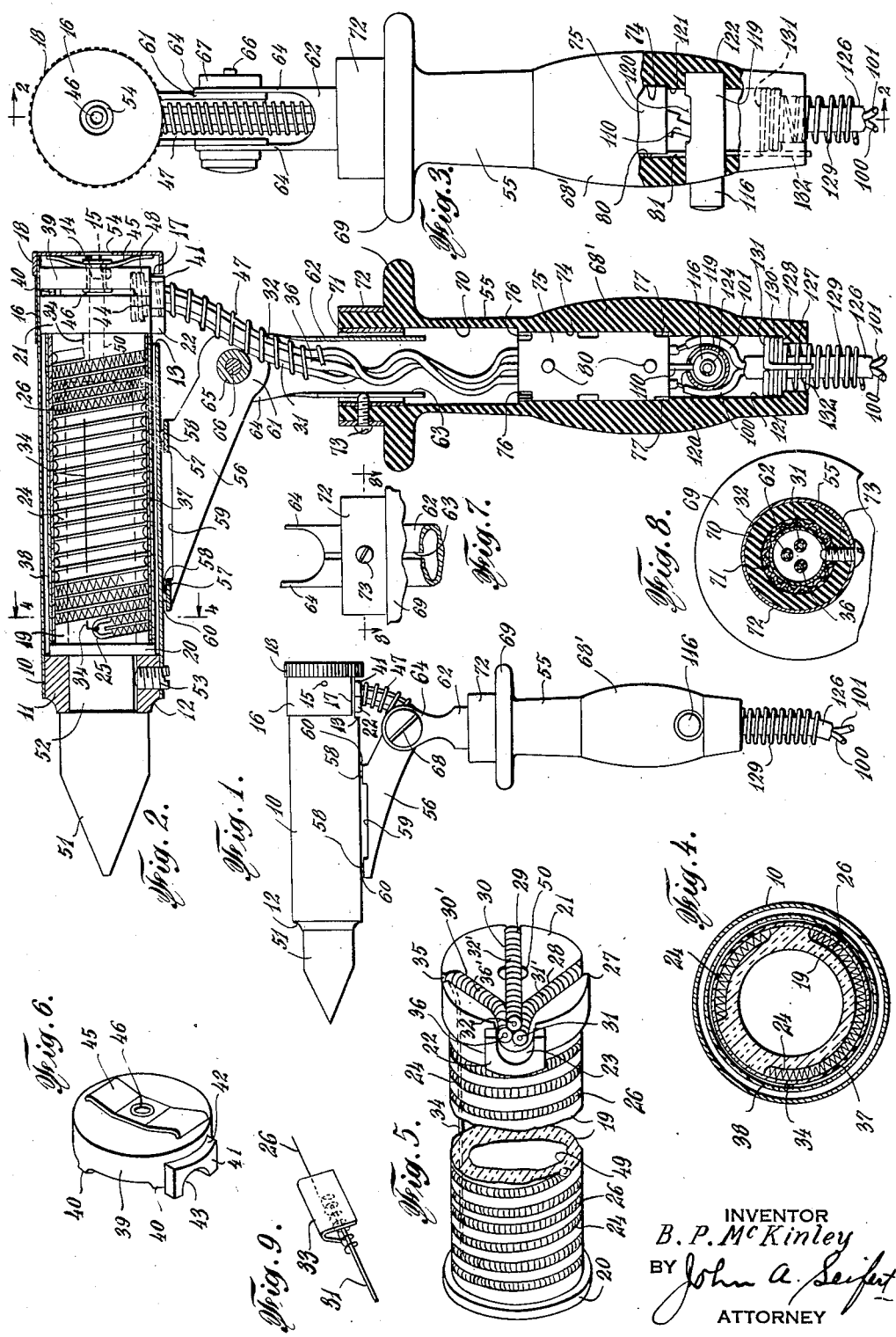
INVENTOR
B. P. McKinley
BY John A. Seifert
ATTORNEY Dec. 18, 1945.    B. P. McKINLEY    2,391,065
ELECTRICALLY HEATED DEVICE
Filed June 14, 1941    2 Sheets-Sheet 2
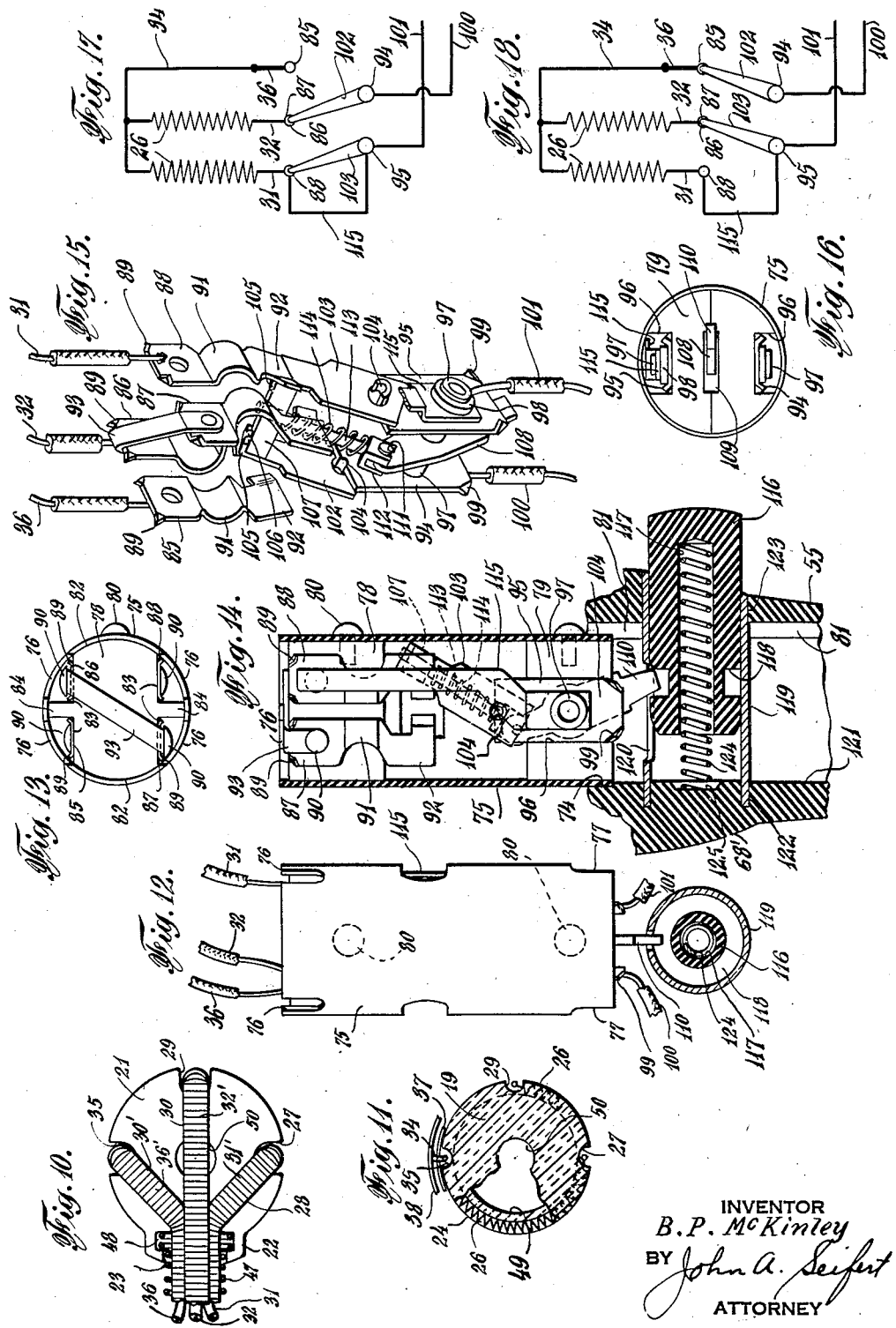
INVENTOR
B. P. McKinley
BY John A. Seifert
ATTORNEY Patented Dec. 18, 1945

2,391,065

UNITED STATES PATENT OFFICE 2,391,065

ELECTRICALLY HEATED DEVICE

Benjamin P. McKinley, Chicago, Ill., assignor to McKinley Mockenhaupt Co., Chicago, Ill., a corporation of Illinois Application June 14, 1941, Serial No. 398,080

3 Claims. (Cl. 219—26)

This invention relates to electrically heated devices and particularly electrically heated soldering devices or irons comprising a tubular housing or shell adapted to carry an electric heating element consisting of a spool of electric resistance and heat conducting material having an electric resistance coil wound thereon, and a soldering bit engaged in one end of the housing to extend into the spool for the full length of the spool and having a tip extending from the housing, and the housing being pivotally mounted on a handle.

It is the principal object of the invention to provide an electrically heated device having an electric resistance element and means adapted to electrically connect the resistance element in different relations with a source of electricity to change the wattage and obtain different conditions of heat, and whereby the resistance element will have a longer life.

It is a further object of the invention to provide a novel circuit arrangement for the heating element and novel switch mechanism to connect the entire heating element through said circuit arrangement in different circuits with a source of electricity and generate heat of different temperatures to vary the rate of heating the soldering bit.

It is a further object of the invention to connect a shell for an electric heating element to a hand grip or handle by point contacts to reduce the transmission of heat from said heating element through the shell to the hand grip.

It is another object of the invention to provide an improved construction and arrangement of a shell and electric heating element whereby the heating element may be readily removed from and replaced in the shell.

Another object of the invention is to provide a novel connection between electric conductors and the terminal ends of an electric resistance element to prevent corrosion of the conductors and the imparting of a mechanical strain to the terminals of said resistance element.

A still further object of the invention is to provide inexpensive means to mount a shell for an electric heating element and soldering bit on a hollow supporting handle by means of a slotted tubular member pivotally connected to the shell and engaged in a sleeve or bushing having an undulating wall engaged in one end of the handle to provide passages for the circulation of air to dissipate heat transmitted from the shell to the handle.

Another object of the invention is to provide a novel arrangement of a switch mechanism having a double-pole, double-throw contact maker and pairs of contacts connected to an electric resistance element whereby portions of said resistance may be placed in series or multiple with each other.

Other objects and advantages of the invention will be set forth hereinafter in the detail description of the invention.

In the drawings accompanying and forming a part of this invention, Figure 1 is an elevational view of a soldering device forming the embodiment of this invention.

Figure 2 is a view similar to Figure 1 on an enlarged scale and in section to show the principal features of the invention.

Figure 3 is an end elevational view of the soldering device looking at the right hand side of Figure 1.

Figure 4 is a cross sectional view of an electric heating element and its carrying shell taken on the line 4—4 of Figure 2 looking in the direction of the arrows.

Figure 5 is a perspective view of the electric heating element broken away at an intermediate portion to show the tubular structure thereof.

Figure 6 is a perspective view of an insulating block arranged with resilient means to cooperate with a closure cap for the shell to yieldingly retain the heating element in predetermined position within said carrying shell.

Figure 7 is a fragmentary view of a contractible tubular bracket member engaged in a hand grip and held in expanded condition by a screw looking at the left hand side of Figure 2.

Figure 8 is a cross sectional view of the hand grip taken on the line 8—8 of Figure 7 looking in the direction of the arrows to show a serrated wall bushing.

Figure 9 is a perspective view of a connection between a terminal end of a resistance coil and an electric conductor and a clamping member engaged on said connection to prevent corrosion of the conductor and a mechanical strain being imparted to the resistance coil.

Figure 10 is a view looking at the top of the heating element to show insulating beads engaged on the electric conductors and a coiled spring guard having an end anchored to the heating element.

Figure 11 is a sectional view of the heating element taken on a transverse line below the end shown in Figure 10 to show the resistance coils entering said end.

Figure 12 is an elevational view of an electric switch mechanism adapted to be mounted in the hand grip and positioned relative to a push button shown in section.

Figure 13 is an end view of the electric switch mechanism looking at the top end of the switch mechanism shown in Figure 14.

Figure 14 is a view of the switch mechanism looking at the right hand side of Figure 12 with the casing or shell thereof in section to show the contact maker actuated to its normal position by the push button shown slidably mounted in a portion of the hand grip.

Figure 15 is a perspective view of the contacts and contact maker of the electric switch.

Figure 16 is an end view of the switch mechanism looking at the bottom end of the switch mechanism shown in Figure 14.

Figure 17 is a diagrammatic view of the electric circuit of the heating element and electric switch with the electric switch actuated to normal position to place sections of the electric resistance of the heating element in series with each other.

Figure 18 is a view similar to Figure 17 with the electric switch actuated to place the sections of the electric resistance in multiple with each other and increase the rate of heating the soldering bit.

In the embodiment of the invention illustrated in the accompanying drawings, there is provided a metallic shell 10 of tubular form having a bushing 11 secured in one end of the shell, as by sweating or in any other suitable manner, with the outer end of the bushing projecting from the shell and arranged with an annular groove of arcuate shape in cross section, as shown at 12. The opposite end of the shell is arranged with an opening 13 in the side wall extending inwardly from said end and a pair of bayonet joint shape slots or recesses 14 on opposite sides of the opening 13 with the lateral portions of the slots extending in opposite directions for the engagement of nibs 15 pressed inwardly from a skirt portion of a cap member 16 and on opposite sides of an opening 17 in said skirt portion of greater width than the opening 13 and positioned nearer one of the nibs 15, so that the engagement of the nibs in the slots 14 to secure the cap on the shell will position the opening 17 centrally of the opening 13 for a purpose to be hereinafter described. The skirt adjacent to the closed end of the cap member 16 is arranged with an annular protuberance having serrations or notches therein to facilitate the engagement of the cap on the shell and nibs 15 with the slots 14, as shown at 18 in Figure 1.

The shell 10 is adapted to carry an electric heating element comprising a tubular mounting member or spool 19 of dielectric material having a high thermal conductivity, such as procelain, and arranged with an annular enlarged portion 20 at one end and another annular enlarged portion or head 21 at the opposite end of substantially the same diameter as the portion 20 but of greater length or thickness and arranged with a protuberance 22 extending from the circumference thereof and having an arcuate recess or channel 23 extending transversely thereof. The bores of the spool 19 and the bushing 11 are of substantially the same diameter to form an elongated cylindrical chamber in the shell 10 when the spool is mounted in the shell for a purpose to be hereinafter described. The outer surface of the member 19 between the annular enlarged portions 20 and 21 is provided with two spiral grooves 24 commencing at separate points adjacent the enlarged end portion 20 and connected to each other adjacent the point of commencement by a passage 25, and said grooves 24 terminating at separate points adjacent to the head 21 and spaced approximately 90 degrees apart. A pair of coiled electric resistance wires 26 of equal length are mounted in the grooves 24 and one end of each wire is straight and connected to each other by twisting said ends upon each other and the connected ends are engaged in the connecting passage 25 of the grooves 24. The opposite or terminal end of one of said wires 26 is extended through a longitudinal passage 27 in the circumference of the head 21 leading from the terminating end of one of the grooves 24 to a transverse passage or channel 28 in the top of the head 21 extending from the passage 27 to the recess 23 in the head protuberance 22. The other end or terminal of the other wire 26 is extended through a longitudinal passage 29 in the circumference of the head 21 at 90 degrees to the passage 27 leading from the terminating end of the groove 24 to a transverse passage or channel 30 in the top of the head extending diametrically across the head from the passage 29 to the recess 23 in the head protuberance 22, as shown in Figures 5 and 10. The terminal ends of the resistance wires 26 are extended through the passages 27, 28, 29 and 30 and are connected in said passages, preferably at the junctures of the passages 27, 28 and 29, 30 to electric conductors 31, 32 of suitable material, such as chrome or nickel, by winding the terminal ends of the resistance wires around the ends of the conductors and clamping a U shaped member 33 of suitable material, such as metal, over said connections, as shown in Figure 9. This manner of connecting the terminals of the resistance wires 26 with the ends of the conductors 31, 32 will prevent corroding of the conductors and take up all strains and stresses imparted to the resistance wires through the conductors. The conductors 31 and 32 are passed through the channels 28 and 30, respectively, and the recess 23 in the head protuberance 22.

It is customarily desired to adapt the electric heating element of soldering irons and the like devices to be energized to produce soldering temperatures within different periods of time depending upon the type of work being performed and it is the common practice to effect this desired result by cutting out of the electric circuit of the resistance wire with a source of electricity a certain portion of said resistance wire whereby the remaining portion of the resistance wire remaining in circuit will be energized and that portion of the article to be heated by the resistance wire, such as a soldering bit, which is adjacent to the energized portion of the resistance wire will be heated and the portion of the article adjacent to the non-energized portion of the resistance wire will be unheated, so that the article will not be uniformly heated for the entire length thereof and satisfactory results cannot be obtained. Furthermore, the frequent energization and de-energization of an electric resistance wire or a part thereof will materially shorten the life of the same. To overcome these disadvantages of the present practice of regulating the heat of the soldering bit, it is proposed to place the resistance wires 26 in series with a source of electricity when it is desired to heat the soldering bit to soldering temperature within a normal period of time and to place said wires in a multiple circuit with the source of electricity when it is desired to obtain soldering temperature within a shorter period. This is accomplished by an electric conductor shown in the present instance to be two strands of electric resistance wires 34 twisted upon themselves and connected at one end to the twisted connected ends of the resistance wires 26 and extended over the coiled resistance wires 26 longitudinally of the insulating member 19 with the opposite ends passed through a passage 35 extending longitudinally of the circumference of the head 21 at 90 degrees to the passage 29 and 180 degrees to the passage 27 and leading to a channel or passage 30' in the end of the head 21, and communicating with the recess 23, as shown in Figures 5 and 10. The end of the twisted strands 34 are connected to an electric conductor 36 in the same manner as the terminals of the wires 26 are connected to the conductors 31, 32 and said conductor 36 is engaged in the passage 30' and recess 23. The resistance wires 26 may be formed of one piece with the intermediate portion folded and positioned in the connecting passage 25 of the grooves 24 and connected to an end of the twisted strands 34. To facilitate mounting of the terminals of the resistance wires 26, 34 and the conductors 31, 32 and 36, the passages 27, 28, 29, 30 and 35 may be grooves or channels in the surfaces of the circumference and top of the head 21, and after the terminals and conductors are placed in said grooves they are covered by dielectric cement. The strands 34 are insulated from the resistance wires 26 by a sheet of suitable material, such as mica, wound into a cylinder and retained between the enlarged portion 20 and head 21 of the insulating or mounting member 19, as shown at 37 in Figure 2. The strands 34 are covered by a similar cylinder 38 of insulating material to insulate said strands from the shell 10 when the heating element is mounted therein. The conductors 31, 32 and 36 are insulated by a series of beads 31', 32' and 36', respectively, of suitable insulating material, such as porcelain, engaged on the respective conductors and which will not deteriorate by the heat of the resistance wires 26.

To assure the mounting of the heating element in the shell 10 without the possibility of longitudinal movement being imparted to the heating element which will result in damage to said element, the heating element is yieldingly retained against the inner end of the bushing 11 by a circular block or disk 39 of dielectric material having lugs 40 projecting from one face thereof and a protuberance 41 extending from a peripheral portion of the block with the upper portion of the protuberance spaced from the face of the block opposite the face from which the lugs 40 extend, as shown at 42 in Figure 6, and the lower portion of the protuberance extending below the face of the block arranged with the lugs and said lower portion being arranged with an arcuate recess 43. The disk 39 is engaged in the end of the shell 10 arranged with the opening 13 and bayonet joint slots 14 after the heating element is engaged in the shell and before the cap 16 is engaged on the shell with the lugs 40 abutting the top of the head 21 and the recess 43 forming with the recess 23 of the head protuberance 22 an opening for the passage of the conductors 31, 32 and 36. A lateral face at the lower end of the protuberance 41 will engage a peripheral portion of the head 21 above the protuberance 22 thereof, as shown at 44 in Figure 2, whereby lateral movement cannot be imparted to the block relative to the head, and the space 42 above the protuberance 41 will accommodate the portion of the serrated protuberance 18 above the opening 17 when the cap is engaged on the shell. The upper face of the block 39 is provided with resilient means adapted to be engaged by the cap 16 and urge the insulating member 19 toward the bushing 11 and comprises a strip 45 of resilient material secured to the face of the block by suitable means, such as a rivet engaged in an opening intermediate the ends of the strip and an opening in the center of the block, as shown at 46 in Figure 6, and the opposite end portions of the strip bent from the block to engage the cap 16, as shown in Figure 2.

To further prevent the separation of the conductors 31, 32 and 36 from the terminal ends of the resistance wires 26 and the twisted strands 34, stresses and strains placed upon the conductors exteriorly of the shell 10 are taken up by a coiled spring guard 47 having one end enlarged and engaged on the conductors with the enlarged end in corresponding recesses in the head 21 and the block 39 adjacent to and communicating with the recesses 23 and 43 in the protuberances 22 and 41, respectively, as shown at 48 in Figures 2 and 10, whereby said end of the spring guard is anchored to the head 21 and block 39 when said block is clamped to the head by the cap 16.

The heating element is adapted to provide for the novel mounting and securing of a soldering bit or rod of suitable material, such as copper, in the shell centrally of and in heat contact with the heating element, by arranging the tubular member 19 with a bore of two different diameters at the opposite end portions of said member, the larger bore portion 49 being of a diameter substantially the same as the bore of the bushing 11 and extending from the end portion 20 for the greater part of the length of the member, and the bore portion of smaller diameter being substantially the same diameter as the center opening 46 in the block 39, as shown at 50. In the present instance, there is illustrated a soldering bit or rod having a tapered tip portion 51 of greater diameter than the bore of the bushing 11 and a body portion 52 of slightly less diameter than the diameters of the bore of the bushing and the bore portion 49 of the tubular member 19 and of a length substantially equal to the combined lengths of the bushing 11 and the bore portion 49 of the tubular member 19, so that the movement of the soldering bit into the heating element is limited by the shoulder formed between the tip portion 51 and body portion 52 abutting the outer end of the bushing 11 and the free end of the body portion 52 abutting the shoulder formed between the bore portions 49 and 50 of the tubular member 19, as shown in Figure 2. It is to be understood that the soldering bit may be of uniform diameter throughout its length and that its inward movement would be limited by its inner end abutting the shoulder formed between the bore portions 49 and 50 of the tubular member 19. The soldering bit is releasably retained in the heating element and carrying shell by a set screw 53 adjustably mounted in screw threaded alined openings in the shell 10 and bushing 11 to be adjusted into abutting relation with the bit, in the present instance, the bit portion 52, as shown in Figure 2.

The transmission of heat from the heating element to the shell 10 is reduced by the radiation of said heat through the bore portion 50 of the tubular member 19, the rivet opening 46 in the displacement block 39 and a center opening 54 in the closed end of the cap member 16, and whereby the shell remains cool.

To facilitate the manipulation of the soldering bit mounted in the heating element and shell relative to a piece of work to be soldered, the shell is adjustably mounted on a handle or hand grip 55 by a pivoted bracket comprising a member having a pair of triangular walls 56 connected to each other to extend in parallel relation by comparatively narrow portions 57 integral with the walls at the same side of two angle portions of the walls and of arcuate shape in cross section to engage the opposite ends of said portions adjacent to the walls with the shell 10 and said ends are secured to the shell by pressing nibs from the concave face of said ends and welding or otherwise securing the nibs to the shell, as shown at 58 in Figures 1 and 2. The member 56, 57 is formed from a one piece blank by folding the walls 56 from the connecting portions 57 in parallel spaced relation to each other and curving the portions 57 with the ends of said portions connecting with the walls projecting above the adjacent side edge of the walls, so that the engaging and securing of the nibs 58 to the shell will space said adjacent side edge of the walls from the shell, as shown at 59, and the nibs will space the portions 57 from the shell, as shown at 60 in Figures 1 and 2, whereby the transmission of heat from the shell to the hand grip will be reduced. The remaining free angle portion of the walls 56 is in the form of a rounded perforated ear 61 extending in a diagonal direction from the shell and terminating in line with the lower edge of the opening 13 in the shell and is adapted to be pivotally connected to another member of the bracket comprising a tubular member 62 of comparatively stiff material, such as metal, being slotted longitudinally, as shown at 63 in Figures 2 and 7, to permit radial expansion of said member, and one end of the tubular member 62 being arranged with a pair of flat ear portions 64 extending in parallelly spaced relation to each other and having the edges extending in an arc of a circle and a centrally alined perforation in each ear. The ear portions 64 are engaged over the ears 61, so that the inherent resiliency of the member 62 will frictionally retain the ears 64 on the ears 61. The ears 61 are maintained in predetermined spaced relation by a spacer in the form of a sleeve or bushing 65, and the members 56 and 62 are pivotally connected to each other by a headed pin 66 engaged in the alined perforations of the ears 61 and 64 and the spacer 65 with the free end screw threaded and adapted to be projected from an ear 64 and engaged by a disk nut 67, as shown in Figure 3. The head of the pin 66 is slotted to facilitate tightening the nut 67 onto the pin, as shown at 68 in Figure 1. The hand grip 55 is of tubular form having a bulbous outer contour 68' adjacent one end and a laterally extending annular guard 69 adjacent the opposite end. The bore of the hand grip is arranged with portions of different diameters with the bore portion 70 of largest diameter arranged in the end portion of the hand grip having the guard 69 and adapted for the engagement of the tubular bracket member 62 by having a tubular sleeve or bushing 71 engaged therein. The wall of the bushing 71 is undulating with the outer ridges engaging the wall of the bore portion 70 and the inner ridges engaging the tubular bracket member 62, as shown in Figure 8. The end of the hand grip projecting from the guard 69 is re-enforced by a ferrule 72 of suitable material, such as metal. The ferrule 72, hand grip 55 and undulating bushing 71 are arranged with alined openings with the opening in the hand grip screw threaded for the adjustable engagement of a screw having the inner end tapered to engage in the slot 63 of the tubular bracket member 62 and spread or expand said bracket member against the inner ridges of the undulating wall of the bushing 71, as shown at 73 in Figure 8. The undulating bushing 71 permits the circulation of air which will cool the tubular bracket member 62 and reduce the transmission of heat from the soldering iron to the hand grip.

Adjacent to the bore portion 70 and extending for the greater part of the length of the bulbous portion 68' of the hand grip 55, the bore of the hand grip is arranged with a portion 74 of smaller diameter than the bore portion 70 adapted for the mounting of a switch mechanism therein, as shown in Figure 2. The switch mechanism comprises a tubular shell or casing 75 of suitable electrical insulating material, such as fiber, cardboard or "Bakelite" and of an outer diameter to fit snugly in and be slidably engaged in the bore portion 74, and having pairs of diametrically opposed recesses 76 extending longitudinally inward from one end thereof and a pair of diametrically opposed recesses 77 extending longitudinally from the opposite end and centrally of the separating wall of the pairs of recesses 76. The shell 75 is adapted to carry two blocks 78, 79 of electrical insulating material, such as "Bakelite" at the opposite end portions thereof and said blocks being secured therein by pins engaged in alined perforations in the shell and blocks and having a rounded head projecting from the shell in vertical alinement with each other, as shown at 80. The heads of said pins are adapted to engage a slot 81 extending longitudinally in the wall of the bore portion 74 of the hand grip 55 to facilitate the mounting of the switch mechanism in the bore portion 47 through the bore portion 70 and prevent the turning of the switch mechanism in the bore portion 74, as shown in Figures 3 and 14. The block 78 has opposite lateral faces of arcuate shape in cross section to slidably engage the opposite sections of the inner wall of the switch shell 75, as shown at 82 in Figure 13, and opposite flat faces 83 joining the arcuate faces 82 and having lugs 84 projecting from said flat faces midway of the arcuate faces 82 to engage the separating wall portions of the recesses 76 and form four separated seats for contact blades 85, 86, 87 and 88 on the flat faces 83. The contact blades are similar in structure and comprise elongated strip of electrical conducting material, such as copper, with one end flat and arranged with outwardly extending nibs 89 at the free corners and perforations in the center thereof for engagement of securing means, such as rivets or screws, embedded in the insulating block 78, as shown at 90, to secure the contacts to the flat faces 83 with the nibs 89 extending outwardly therefrom. The intermediate portions of the contacts are cut away along a longitudinal edge of the contact and arched outwardly from the block, as shown at 91, to impart resiliency to the contact blade ends of the contacts which extend obliquely from the arched intermediate portions 91 with the outer longitudinal edge in vertical alinement with the outer longitudinal edge of the mounting end portions of the blades and the inner or opposed longitudinal edges of the contact blade ends having outwardly flaring lips, as shown at 92. The lip 92 of the contact blade 85 is of greater length than the lips 92 of the other blades 86, 87 and 88, so that the space between the lips 92 of the blades 85 and 86 is less than the space between the lips 92 of the blades 87 and 88 for a purpose to be hereinafter described. The contacts 86 and 87 are electrically connected to each other by a conductor strip or strap 93 having the opposite end portions bent laterally and secured to the contacts by engaging the rivets 90 in openings in said ends with the under face of the conducting strap engaging the mounting ends of the contacts and the body of the strap extending over the outer end of the insulating block 78, as shown in Figures 13, 14 and 15. The conductors 31, 32 and 36 of the heating element are extended from the soldering iron housing 10 into and through the tubular bracket member 62 and the bore portion 70 of the hand grip and are connected to the contacts 85, 86, 87 and 88, as follows: The conductor 31 is connected to the contact 88. The conductor 32 is directly connected to the contact 86 and indirectly to the contact 87 through the conductor strap 93. The conductor 36 is connected to the contact 85. The conductors 31, 32 and 36 may be connected to the contacts 88, 86 and 85, respectively, while said contacts are being mounted on the insulating block 78 by curling the bear ends of the conductors around the rivets 90 which are of conducting material, such as copper, and interposed between the heads of the rivets and the contacts, or the conductors may be connected to the contacts after the contacts are assembled on the insulator block 78 by engaging the bear ends of the conductors with the nibs 89 and securing the bear ends to the nibs by suitable means, such as solder. The recesses 76 in the shell 75 facilitate the connecting of the conductors to the contacts.

The contacts 85, 87 and 86, 88 are adapted to be connected in pairs to a source of electricity by a double-pole, double-throw contact maker mounted on the insulator block 79 and comprising a pair of plates 94, 95 of conducting material, such as copper, constituting mounting and terminal members for the contact maker, mounted in opposed recesses 96 in the periphery of the insulator block 79 with the inner ends of the plates projecting above the block 79 and secured in said recesses by a tubular member 97 engaged in alined perforations in the plates 94, 95 and a transverse opening through the insulator block 79 and the opposite ends of the tubular member swaged over the outer surfaces of the plates and an insulating washer engaged on said member against said outer surfaces and in the perforations of the plates, as shown at 98 in Figures 15 and 16. The outer ends of the plates 94, 95 are arranged with outwardly extending nibs 99 to facilitate the connection of the bear ends of conductors 100, 101 leading from a source of electricity to the mounting plates 94, 95, respectively. The conductors 100, 101 are connected to the plates 94, 95, respectively, in the same manner as the conductors 31, 32 and 36 are connected to the contacts 88, 86 and 85, respectively. The recesses 77 in the insulating shell 75 will facilitate the connecting of the conductors 100, 101 to the terminal members 94, 95. The members or plates 94, 95 pivotally support a pair of contact or circuit maker blades 102, 103 having alined openings therein adjacent to one end for the pivotal engagement of ears bent laterally from the inner ends of the plates 94, 95 and of arcuate shape in cross section with the convex surface extending inwardly toward the outer ends of the plates, as shown at 104 in Figures 14 and 15, to provide an arcuate bearing surface for the openings in the contact maker blades. The free ends of the contact maker blades 102, 103 are bent inwardly toward the opposite blade, as shown at 105 in Figure 15, and said bent end portions 105 having nibs or ears 106 adapted to be embedded in a cross piece or block 107 of insulating material, spanning the space between the contact maker blades and engaging under the bent end portions 105, whereby the contact maker blades are maintained in spaced and insulated relation to each other. The contact maker blades are actuated and yieldingly retained in engagement with either pair of contacts 85, 87 or 86, 88 by a toggle actuating mechanism comprising a lever 108 engaged in a rectangular opening 109 extending longitudinally through the center of the block 79 and said lever having an opening through the longitudinal center intermediate the ends thereof to pivotally mount the lever on an intermediate portion of the tubular member 97. One end of the lever 108 is of reduced width and projects from the outer end of the block 79, as shown at 110, for a purpose to be hereinafter described, and the opposite end of the lever projects from the inner end of the block 79 and is arranged with a perforation for the engagement of the center portion of a pin 111 having the opposite end portions engaging arcuate recesses in the ends of leg portions of a yoke member 112 having a stem or rod 113 fixed at one end thereof in the yoke member and the opposite end slidably mounted in an opening in the center of the insulator spacing block 107 to permit longitudinal movement of the stem relative to the contact maker blades 102, 103 during the pivotal movement of the lever 108 from one end to the opposite end of the opening 109. A snap action is imparted to the actuation of the lever 108 from one end position to the other end position to assure the engagement of the contact maker blades 102, 103 with either pair of contacts 85, 87 or 86, 88 by a coil spring 114 engaged on the rod 113 and compressed between the yoke member 112 and the insulator spacing block 107. To facilitate the mounting of the lever 108 in the insulator block 79, said block may be made of two corresponding half sections with each section having a recess 96 in an arcuate face and a recess in a flat face constituting one half of the rectangular opening 109 and said half sections are secured to each other by the tubular member 97.

The position of the contact maker blades 102, 103 in engagement with the pair of contacts 86, 88, as shown in Figures 14 and 15, will connect the resistance wires or coils 26 in series with the source of electricity, as shown in Figure 17, by the electric current passing through the conductor 100, terminal plate 94, contact maker blade 102, contact 86, conductor 32, coils 26, conductor 31, contact 88, contact maker blade 103, terminal plate 95 and conductor 101. When the coils are connected in series, said coils will consume approximately between sixty and one hundred fifty watts depending upon the size and length of the coils and will create a soldering temperature within a normal or reasonable period of time. When it is desired to produce the soldering temperature within a shorter period of time, the coils 26 are placed in a multiple circuit with the conductors 100, 101 and the source of electricity by actuating the lever 108 to position the contact maker blades 102, 103 in engagement with the contacts 85, 87, so that the conductor 34 is placed in the circuit of the conductors 100, 101, as shown in Figure 18, by passing the electric current through conductor 100, terminal plate 94, contact maker blade 102, contact 85, conductor 36, conductor 34, the coil 26 on the right hand side of Figure 18, conductor 32, conductor strap 93, contact 87, contact maker blade 103, terminal plate 95 and conductor 101. It will be seen that in this position of the contact maker blades 102, 103, the coil 26 on the left hand side of Figure 18 and which is connected to contact 88 is not in the circuit of the conductors 100, 101, and to overcome this defect and have said coil 26 in circuit with the conductors 100, 101, the contact 88 is permanently connected to the terminal plate 95 by a conductor in the form of a strip 115 of electrical conducting material having one end offset laterally and engaged on the tubular member 97 between and in engagement with the insulating washer 98 and the terminal plate 95 and the opposite end positioned in engagement with the outwardly arched portion 91 and securing rivet 90 of the contact 88, as shown in Figures 14 and 15. The conductor 115 will permit the electric current to flow from the conductor 34 to the coil 26 at the left hand side of Figure 18, the conductor 31, contact 88, conductor 115, terminal plate 95 and conductor 101.

The lever 108 is actuated and normally urged to the position shown in Figures 14 and 15 to engage the contact maker blades 102, 103 with the contacts 86, 88 by a push button 116 having a bore or circular recess 117 extending inwardly from one end and terminating within the opposite end and an annular recess or groove 118 in the side wall adjacent to the end to which the recess 117 opens. Said button is slidably mounted in an elongated sleeve 119 having an elongated opening 120 in the side wall adjacent one end and mounted in the hand grip to extend transversely of a bore portion 121 adjacent to and of smaller diameter than the bore portion 74. The sleeve 119 is mounted in the hand grip 55 at the outer end of the bulbous portion 68' by engaging the end adjacent to the opening 120 in an annular groove in the wall of the bore portion 121, as shown at 122 in Figure 14, and the opposite end portion of the sleeve engaged in an opening 123 extending through the wall of the hand grip 55 in opposed alinement with the annular groove 122 and the edge of said opposite end terminating in the contour of the bulbous portion 68'. The sleeve 119 is positioned adjacent to the block 79, so that the narrow projecting end portion 110 of the lever 108 extend through the opening 120 in the sleeve 119 and into the annular groove 118 of the push button 116. The engagement of the end portion 110 in the groove 118 will retain the push button 116 in the sleeve 119 and transmit the actuation of the push button to the lever 108 and contact maker blades 102, 103. The push button is yieldingly urged outwardly of the sleeve 119 and the lever 108 actuated to position the contact maker blades in engagement with the contacts 86, 88, by a coil spring 124 engaged in the recess 117 in the push button and compressed between the end of said recess and a circular recess or seat 125 in the wall of the bore portion 121 centrally of the annular groove 122. In assembling the switch mechanism and push button in the hand grip, the push button and its actuating spring is first mounted in the sleeve 119 and held in said sleeve with the annular groove 118 in register with the opening 120 and then the switch mechanism is engaged in the bore portion 74 through the bore portion 70 and the projecting end portion 110 of the lever 108 is inserted in the groove 118 of the push button when the push button is released.

The conductors 100, 101 are extended from the switch mechanism and passed on opposite sides of the sleeve, as shown in Figure 2, and after they are past the sleeve they are encased in an insulating sheathing 126 of usual construction and extended through an opening 127 in the end of the hand grip of smaller diameter than the adjacent bore portion 121 and forming a shoulder 128 at the juncture of the opening with the bore portion 121. An off and on switch of usual construction is interposed in and connected to the conductors 100, 101 exteriorly of the hand grip and at a suitable distance therefrom to connect and disconnect the switch mechanism mounted in the hand grip and the heating element from the source of electricity. This on and off switch has not been shown in the drawings as it does not form a part of the present invention. To take up the stresses and strains ordinarily applied to the conductors 100, 101 during the use of the soldering iron, a coil spring guard 129 is engaged on the sheathing 126 with an enlarged end portion 130 of the guard engaged in the bore portion 121 and abutting the shoulder 128. To prevent the guard 129 from turning and imparting said movement to the conductors 100, 101 which may result in loosening said conductors from the terminal plates 94, 95, there is provided an annular member 131 which may be formed of spring wire positioned against the end of the enlarged end portion 130 and held in said position by bending an end of said wire parallelly of the axis of said member and engaging said bent end in the groove or slot 81 which is extended into the bore portion 121 and opening 127, as shown at 132 in Figure 3.

In the operation of the device, the on and off switch interposed in the conductors 100, 101 is actuated to "on" position and the resistance coils 26 are energized at the ordinary rate of consumption by being placed in series with each other, as shown in Figure 17, and the device may be left in this condition for long periods of time without damaging the coils. When it is found that the work is consuming the heat of the soldering bit at a greater rate than it is being produced by the heating coils, said coils are placed in a multiple circuit by actuating the push button into the hand grip which will actuate the contact maker blades from the position shown in Figures 14 and 15 to the opposite position in engagement with the contacts 85, 87, whereby the coils are placed in circuit with the conductor 34, as shown in Figure 18. The button 116 is retained in said depressed position until the soldering bit has attained soldering temperature again when the button is released. It has been found that it is only necessary to depress the button a few minutes to produce soldering temperature.

The wide lip 92 of the contact blade end of the contact 85 will maintain the conductor 34 in circuit with the conductor 100 after the coil 26 at the right hand side of Figures 17 and 18 has been disconnected from the conductor 101 during the movement of the push button 116 to its normal position under the force of the spring 124, so that the full force or load of the electric current will not be placed on the coil 26.

Having thus described my invention, I claim:

1. In an electric soldering device, a tubular shell having an opening in the wall thereof extending inwardly from one end and the opposite end being restricted, a tubular member of electric insulating and thermal conducting material having a head at one end arranged with a laterally extending protuberance to extend through the opening in the shell and the opposite end of the tubular member abutting the restricted end of the shell, said head of the tubular member having passages therein extending from spaced peripheral portions to the protuberance, an electric resistance element coiled around the insulating member and having the terminals terminating at the head of said member, a cap removably mounted on the end of the shell arranged with the opening, a block of insulating material having a lateral protuberance corresponding to the protuberance of the insulating member and a resilient member fixed to one face of said block, said block being mounted in the shell between the head of the insulating member and cap with the resilient member abutting the cap whereby the cap yieldingly retains the insulating member against the restricted end of the shell and the lateral protuberance extending through the opening in the shell, electric conductors connected to the terminals of the resistance element and engaged in the passages in the head and passed through the protuberances of the insulating member and block, a U-shaped member engaged over and clamped to the connection of and securing the electric conductors in electrical connection with the terminals of the resistance elements, a soldering bit extended through and supported by the restricted end of the shell into the insulating member, and a screw adjustably mounted in the restricted end of the shell to releasably retain the soldering bit in the restricted end of the shell and insulating member.

2. In an electric soldering device, a tubular shell, a tubular member of insulating and thermal conducting material having a head at one end arranged with passages extending from spaced peripheral portions to a common peripheral portion of the head and the member releasably mounted in the shell, an electric resistance coiled around the insulating member and the ends terminating at the spaced ends of the passages in the head of said member, electric conductors entering the head of the insulating member at the common end of the passages and connected to the terminating ends of the resistance, U shaped members engaged over and clamped to the connections between the resistance and conductors to prevent corroding of the conductors and a mechanical strain on the resistance at said connections, beads of electric insulating and heat resistance material engaged on the connected ends of the resistance and conductors to prevent deterioration of the conductors, a soldering bit engaged in the insulating member and projecting from the shell, and a screw adjustably mounted in the shell to releasably retain the soldering bit in the insulating member.

3. In an electric soldering device, a tubular hand grip, a tubular shell connected to and carried by one end of the hand grip and arranged at one end for the engagement and supporting of a soldering bit, an electric heater in the shell including a resistance element and a carrier therefor of insulating and thermal conducting material having passages in one end thereof, one end of each of said passages having a common opening through the side of the carrier and said passages diverging therefrom transversely of the end of the carrier and the opposite diverging ends of the passages opening through and spaced about the side of the carrier opposite the common opening, conductors engaging in the carrier passages and electrically connected to the terminals of the resistance element in the diverging ends of the passages spaced about the side of the carrier and extended from the common opening through an opening in the shell into the hand grip, a U-shaped member engaged over and clamped to the connection of and securing the electric conductors with the terminals of the resistance element, and a dielectric cement covering the conductors and connection thereof with the terminals of the resistance element in the passages.

BENJAMIN P. McKINLEY.